(12) United States Patent
Spangenberg

(10) Patent No.: US 6,568,383 B2
(45) Date of Patent: May 27, 2003

(54) DISC-SHAPED CUTTING TOOL

(75) Inventor: Rolf Spangenberg, Gauting (DE)

(73) Assignee: Hilti Aktiengesellschaft, Schaan (LI)

( * ) Notice: Subject to any disclaimer, the term of this patent is extended or adjusted under 35 U.S.C. 154(b) by 12 days.

(21) Appl. No.: 09/900,846

(22) Filed: Jul. 5, 2001

(65) Prior Publication Data

US 2002/0002971 A1 Jan. 10, 2002

(30) Foreign Application Priority Data

Jul. 7, 2000 (DE) .......................................... 100 33 101

(51) Int. Cl.⁷ ............................................... B23F 27/03
(52) U.S. Cl. ......................... 125/15; 451/541; 451/547
(58) Field of Search .......................... 125/15; 451/541, 451/547, 544, 546

(56) References Cited

U.S. PATENT DOCUMENTS

| | | | |
|---|---|---|---|
| 2,379,243 A | * | 6/1945 | Milne |
| 2,755,601 A | * | 7/1956 | Lux |
| 3,133,533 A | * | 5/1964 | Sprague |
| 4,004,378 A | * | 1/1977 | Maxey |
| 5,471,970 A | * | 12/1995 | Sakarcan ...................... 125/15 |
| 5,758,561 A | | 6/1998 | Curtsinger |
| 6,277,017 B1 | * | 8/2001 | Ji ................................ 451/547 |
| 6,408,838 B1 | * | 6/2002 | Ogata et al. ................... 125/15 |

FOREIGN PATENT DOCUMENTS

| | | |
|---|---|---|
| DE | 1959323 | 4/1967 |
| DE | 9638718 | 10/1997 |
| RU | 0905075 | 2/1982 |

OTHER PUBLICATIONS

Patent Abstract of Japan No. 03–287,382, Dec. 12, 1991.

* cited by examiner

Primary Examiner—Eileen P. Morgan
(74) Attorney, Agent, or Firm—Sidley Austin Brown & Wood, LLP

(57) ABSTRACT

A cutting tool, includes a disc-shaped base member (1), a plurality of ring segment-shaped cutting regions (2) provided at a circumference of the base member (1) separated circumferentially by recesses (4) open at an outer contour of the base member (1) and extending radially through respective cutting regions (2), and at least one elongate opening (5) located in each section (A) of the base member (1), which is defined by a respective cutting region and is limited by two imaginary liens extending from the center (C) of the base body 1 and passing through adjacent recesses (4), and by the central bore (3) of the base member (1), with the opening (5) extending radially along a section of an imaginary spiral line starting from a center of the base member (1).

6 Claims, 1 Drawing Sheet

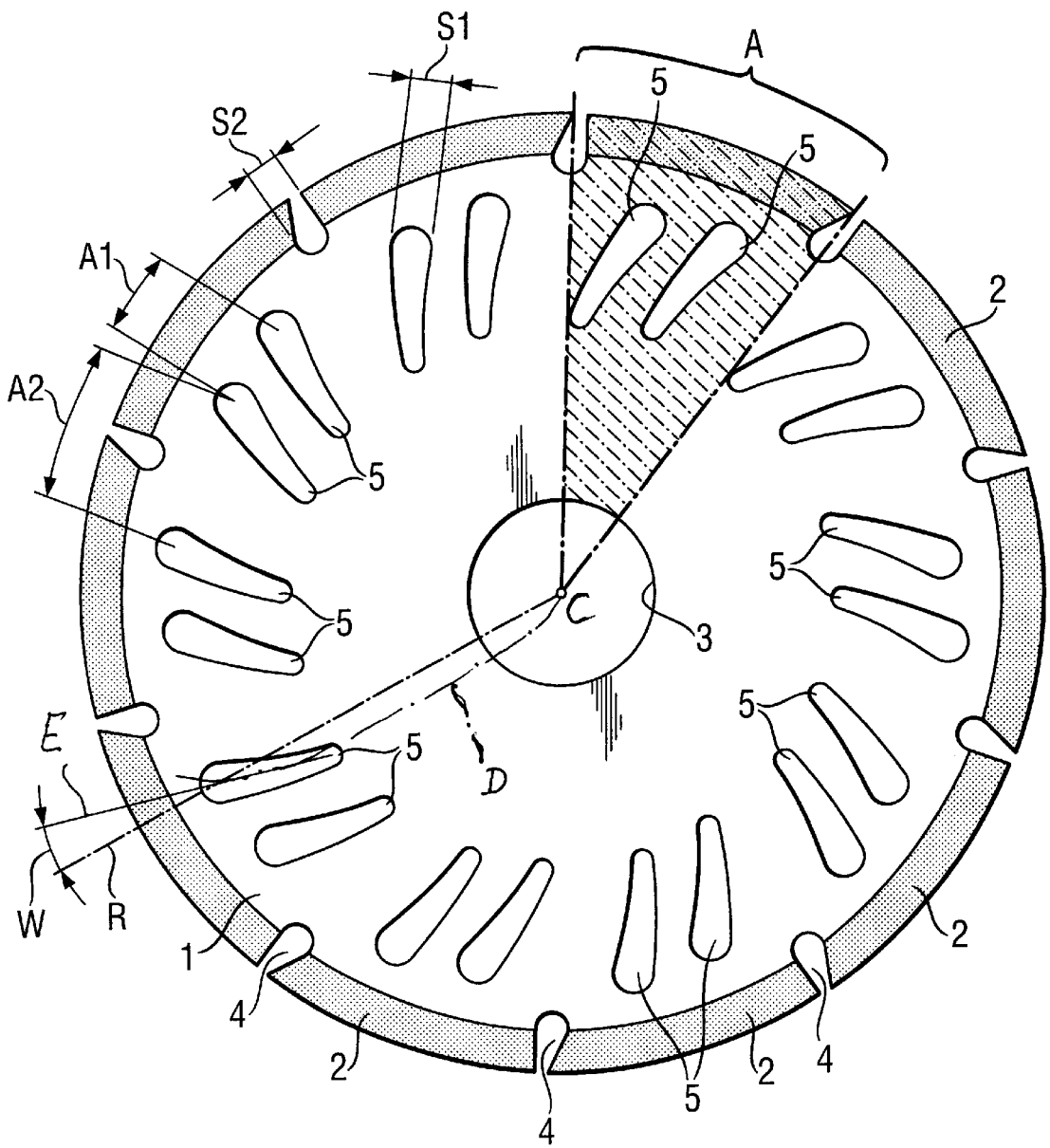

DISC-SHAPED CUTTING TOOL

BACKGROUND OF THE INVENTION

1. Field of the Invention

The present invention relates to a cutting or parting tool including a disc-shaped base member having a central bore, a plurality of ring segment-shaped cutting regions provided at a circumference of the base member and separated circumferentially by recesses open at an outer contour of the base member and extending radically through respective cuffing regions, and at least one elongate opening located in a section of the base member which is defined by a respective cutting region and is limited by two imaginary lines extending from the center of the base member and passing through adjacent recesses, respectively, and by the central bore.

2. Description of the Prior Art

For forming slots in a constructional component in which concealed conduits can be buried, masonry slotting tools which have at least two spaced from each other, disc-shaped parting tools, are used. The spacing between the two parting tools depends on the width of a to-be-formed slot. The two parting tools form two, spaced from each other, slots in a constructional component. Then, the web, which remains between the two slots is removed from the constructional component by a suitable break-out tool, and a channel, in which at least one concealed conduit can be laid in, is formed.

A disc-shaped parting tool for use in masonry slotting power tool is disclosed in German publication DE42 43 480. The disclosed disc-shaped parting tool has a disc-shaped base member having a central bore that provides for mounting of the parting tool on a receiving flange of a masonry slotting power tool.

The base member has, at its circumference, a plurality of circular cutting regions separated by recesses which are open at the out contour of the base member.

In addition to the separating recesses, the base member has a plurality of radially extending elongate openings. Each elongate opening is located in a section which is limited by two adjacent separating recesses and the central bore.

During cutting of mineral constructional components with the use of a so-called dry cutting process, the cutting regions are subjected to high temperatures and to formation of a large amount of cuttings. The removal of the cuttings is effected upon rotation of a parting tool in a direction opposite to the cutting direction, by a surrounding air that flows through the elongate openings which are formed in the space between the cutting regions and the central bore. When a particular large amount of cuttings is formed, the cuttings cannot be removed sufficiently rapidly from the intermediate space between two parting tools as a sufficiently high circulation of air through the elongate openings cannot be obtained. The reason for this is a large circumferential distance between separate elongate openings.

With an increased amount of cuttings, the cutting region heats up to a very large degree. The reduced air circulation leads to a thermal overstress and damage of the parting tool.

Accordingly, an object of the present invention is to provide a disc-shaped parting tool which would insure a good and reliable removal of cuttings without a thermal overstress of the parting tool.

SUMMARY OF THE INVENTION

This and other objects of the present invention which will become apparent hereinafter, are achieved by providing in each section of the base member, which is limited by two adjacent separating recesses and the central bore, at least one elongate opening extending radially along a section of a spiral line which starts from the center of the base member.

In accordance with the present invention, the elongate openings extend not only radially but also in the circumferential direction, forming, in the circumferential direction, closely following each other, air entry regions through which air can be fed in the intermediate space formed by two parting tools in large amounts. The large amount of air, which is fed to remove the cuttings, also insure a very good cooling of the parting tools.

A particularly good air circulation and removal of cuttings from the intermediate space, which is formed by two, spaced from each other, disc-shaped parting tools, is advantageously achieved when a tangent to a central region of a longitudinal extent of an elongate opening forms with the radius of the base member an angle from 7° to 15°. A particular good removal characteristics are achieved with the angle, which is formed by the tangent and the radius, being equal 11°.

An increased feeding of the air in the vicinity of the cutting region and, thus, a good cooling of the parting tool is advantageously achieved when the width of the elongate openings, measured transverse to its longitudinal extent, increases toward the outer contour of the base member.

Preferably, in at least one section of the base member, which is limited by two separating recesses and the central bore, two elongate openings are provided. This further increases the amount of air entering the intermediate space between the two parting tools. This further contributes to an increased removal of cuttings and cooling of the parting tool. For manufacturing reasons, the two elongate openings are formed substantially with the same size.

In order to be able to achieve a very good air circulation, advantageously, a circumferential distance between the two elongate openings located in the same section of the base member is smaller than a circumferential distance between two adjacent elongate openings of two adjacent base member section.

Accumulation of cuttings in the separating recesses of the base member is prevented when, advantageously, the circumferential width of a recess increases toward the central bore. The cuttings which, e.g., accumulate in the mouth region of a recess, are pressed radially into an expanded portion of the recess by further cuttings. In the expanded portion of the recess, the cuttings have no support and fall through.

In the parting tools, the cutting region is formed or is defined by circumferential region of the base member which is filled with diamond grains. The cutting region can also be formed of separate segment-shaped cutting bodies formed of diamond grains and a matrix material. The separate cuttings bodies can be attached to the base member by soldering, welding, and the like.

The elongate openings can also so be formed that, while being separate from each other, they overlap each other in the circumferential direction of the base member.

The novel features of the present invention, which are considered as characteristic for the invention, are set forth in the appended claims. The invention itself, however, both as to its construction its mode of operating, together with additional advantages and objects thereof, will be best understood from the following detailed description of preferred embodiment, which read with reference to the accompanying drawings.

BRIEF DESCRIPTION OF THE DRAWINGS

Single FIGURES of the drawings shows a rear view of a parting tool according to the present invention.

DETAILED DESCRIPTION OF THE PREFERRED EMBODIMENT

A disc-shaped parting tool according to the present invention, which is shown in the drawing, has a base member 1 with a central bore 3. The thickness of the base member 1 amounts to from 1 mm to 3 mm. A plurality of ring segment-shaped cutting regions 2 are formed at the circumference of the base member 1. The circumferentially arranged, ring segment-shaped, cutting regions 2 are separated from each other by recesses 4. The recesses 4 extend radially through respective cuttings regions and are open toward the outer contour of the base member 1. The width S2 of recesses 4, which is measured parallel to the circumferential direction of the base member 1, increases in a direction toward the central bore 3, with the bottom of the recesses 4 having a semicircular shape.

Two, equal size, elongate openings 5 are provided in each of the sections A of the base member 1 which is defined by a respective cuffing region 2 and is limited by two imaginary lines B, which extend from a center C of the base member 1 and pass through respective recesses 4, and by the central bore 3. The two openings 5 are arranged adjacent to each other in the circumferential direction. Both end regions of each elongate opening have each a semicircular profile. The width S1 of each elongate opening 5 increases toward the outer contour of the base member 1. Each elongate opening 5 extends along a section of an imaginary spiral-shaped line D extending from the center C of the base member 1. A radius R of the base member 1 forms with a tangent E to a central region of the section of the imaginary spiral-shaped line, along which the elongate opening 5 extends, an angle W of 11°.

A distance A1 between two elongate openings 5 located in a section A is smaller than the distance A2 between two adjacent elongate openings 5 of adjacent sections A.

Though the present invention was shown and described with references to the preferred embodiment, such are merely illustrative of the present invention and are not to be construed as a limitation thereof, and various modifications of the present invention and are not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiments within the spirit and the scope of the present inventi0on as defined by the appended claims.

What is claimed is:

1. A cutting tool, comprising a disc-shaped based member (1) having a central bore (3) and a plurality of segment-shaped cuffing regions (2) provided at a circumference of the base member (1) and separated from each other in a circumferential direction by recesses (4) which are open toward an outer contour of the base member (1) and extend radially through respective cuffing regions (2), each segment-shaped cuffing region (2) defining a section (A) of the base member (1) which is limited by two imaginary lines extending from a center of the base member (1) and passing through recesses (4) that separate the section defining cuffing region (2) from adjacent cuffing regions (2); and at least one elongate opening (5) located in each section (A) and extending radially along a section of an imaginary spiral line (D) extending from the center (C) of the base member (1), wherein a tangent (B) to a central region of the section of the imaginary spiral line (D), along which the elongate opening (5) extends, forms with a radius (R) of the base member (1) an angle (W) from 7° to 15°.

2. A cuffing tool according to claim 1, wherein a width (S1) of the elongate opening (5) measured transverse to a longitudinal extent of the elongate opening (5) increases toward the outer contour of the base member (1).

3. A cuffing tool according to claim 1, wherein at least one further elongate opening (5) substantially identical to the at least one elongate opening is located in each section (A) of the base member (1).

4. A cutting tool according to claim 3, wherein both elongate openings (5) have the same size.

5. A cuffing tool according to claim 3, wherein circumferential distance (A1) between the two elongate openings (5) located in a same section (A) is smaller than a circumferential distance (A2) between two adjacent elongate openings (5) of two adjacent sections (A).

6. A cutting tool according to claim 1, wherein each of the recesses (4) has a circumferential width (S2) that increases toward the central bore (3).

* * * * *